United States Patent [19]

Stieg

[11] 3,792,628

[45] Feb. 19, 1974

[54] TORQUE PROPORTIONING AND SPIN LIMITING DIFFERENTIAL

[75] Inventor: Robert W. Stieg, Emmaus, Pa.

[73] Assignee: Mack Trucks, Inc., Allentown, Pa.

[22] Filed: July 3, 1972

[21] Appl. No.: 268,502

[52] U.S. Cl. .................................. 74/714, 74/711
[51] Int. Cl. ........................... F16h 1/42, F16h 1/44
[58] Field of Search ...................... 74/714, 715, 711

[56] References Cited
UNITED STATES PATENTS

| 874,852 | 12/1907 | Lorenz | 74/714 |
|---|---|---|---|
| 2,080,477 | 5/1937 | Higgins et al. | 74/714 X |
| 2,558,417 | 6/1951 | Brown | 74/714 X |
| 2,574,986 | 11/1951 | Schou | 74/714 |
| 3,292,456 | 12/1966 | Saari | 74/711 |
| 3,378,093 | 4/1968 | Hill | 74/714 X |
| 3,420,121 | 1/1969 | Stieg | 74/714 |
| 3,492,890 | 2/1970 | Hill et al. | 74/714 |
| 3,706,239 | 12/1972 | Myers | 74/715 |

Primary Examiner—Allan D. Herrmann
Assistant Examiner—P. S. Lall
Attorney, Agent, or Firm—Brumbaugh, Graves, Donohue & Raymond

[57] ABSTRACT

An inter-axle differential for multiple driving-axle vehicles divides the engine-transmission output torque between two axles or axle groups in proportion to the load distribution among the axles or axle groups. The differential is of the planetary-gear type, with one side gear coupled to one axle or group and the other side gear coupled to the other axle or group. The appropriate torque division between the axles is accomplished by sizing the side gears such that the ratio of their diameters approximates that of the respective axle or axle group loads. A spin limiting feature is also provided. A pinion cage is coupled to the engine-transmission system and retains a plurality of pinions on their outside diameters in hardened cylindrical bores which include longitudinally spaced cut away portions on generally opposite sides of the pinions. The two side gears mesh with the exposed portions of the pinion gears, so that when the pinions rotate in the bores, gear separation forces are developed between the pinions and the side gears that are productive of couples which act across the pinions and urge them against the bore walls, thereby transferring torque to the high load side of the differential.

13 Claims, 4 Drawing Figures

TORQUE PROPORTIONING AND SPIN LIMITING DIFFERENTIAL

BACKGROUND OF THE INVENTION

This invention relates to an improved differential and, more particularly, to an inter-axle differential for unequally proportioning engine torque between two axles or axle groups in a multiple driving-axle vehicle. It further concerns a differential of this type which, in addition, affords a capability of transferring torque from a low traction axle or axle group to a high traction axle or axle group to resist spin out on the low traction side.

In vehicles having multiple driving axles it is desirable to insert a differential mechanism in the drive train between fore and aft axles or groups of axles to eliminate the high drive train windup stresses that would otherwise be induced when these axles attempt to travel slightly different distances, such as occur, for example, due to tire size variations, different axle travel in cornering, and rough terrain variations. A conventional differential of the type which would divide the engine-transmission output torque equally between the two axles or axle groups is unsatisfactory for this purpose, however, because it would produce a poor match of torque distribution to axle loading, and thus would lead to premature axle spinout. That is to say, the more lightly loaded axle, typically the front axle of an all-wheel drive truck, for example, would tend to spin out before the axle or axles under the heavier load, for example, the rear tandem of the truck, when all the wheels are on a constant coefficient surface. Such premature spinout of an axle or axle group is of course undesirable.

A further problem is encountered when surface conditions vary among the wheels, as where one wheel is located on a low coefficient surface such as ice. In this situation, a conventional differential would permit the wheel with poor traction to spin while the other wheels with good traction stand still. With vehicles having multiple driving axles, the problem is even more serious since, if a single wheel spins out, all wheels of the vehicle will be immobilized. It is desirable, therefore, that provision be made for enabling other wheels of the vehicle to operate under such conditions.

Spin limiting differentials are known, as illustrated by U.S. Pat. No. 3,292,456 to Saari. However, the Saari differential finds application only where the torque is divided equally between the shafts connected to the side gears of the differential. Accordingly, it is not suitable for inter-axle uses where plural driving axles are involved and an unequal distribution of the output torque is required to avoid premature single-axle spinout.

The foregoing and other requirements of the prior art are fulfilled by the present invention.

SUMMARY OF THE INVENTION

It is an object of the present invention, therefore, to provide a differential which in one embodiment may be used with a vehicle between two axles or groups of axles having different ground load summations and which divides the engine-transmission output torque therebetween generally in the same proportion as the axle or axle group load division. In this way, the likelihood of premature axle spinout due to a poor match of axle loading to torque distribution is greatly reduced, thereby lengthening axle, gear and tire life.

It is a further object of the invention to provide an inter-axle differential having a torque sensitive frictional biasing characteristic such that torque will be transferred to the high traction side of a vehicle rather than being wasted on the low traction side in the event surface traction conditions vary among the axles.

Another object of the invention is to provide a spin limiting differential in which gear separation forces are utilized to produce cocking couples productive of an increased frictional bias of the differential relative to that which was heretofore available.

It is another object of the invention to provide an inter-axle differential which provides a combination of full time, multiple-axle drive, unequal torque proportioning related to axle loading, and automatic frictional biasing to resist spinout of a single axle on a slippery surface.

An additional object of the invention is to provide an inter-axle differential which affords full time all-wheel drive without requiring engagement and disengagement of one axle or axle group, thereby eliminating the inter-axle driveline windup stresses associated with conventional "clutch in" axle designs when all-wheel drive is engaged.

It is still another object of the invention to provide an inter-axle, spin limiting differential of the type referred to which is of extremely rugged design, compact and wear resistant and which also affords versatility of operation and reduces required driver attention.

These and other objects are attained, in accordance with the invention, by the provision of a planetary-type differential in which the pitch diameters of the two side gears are sized to divide the engine-transmission output torque in the proportion desired. Shaftless pinion gears are interposed between the side gears, e.g., a ring gear and a sun gear, and are retained on their outside diameters in hard surfaced bores of a driving cage coupled to the output of the engine-transmission system. The side gears are separated longitudinally so as to mesh with the pinion gears at opposite ends thereof and thus form two gear planes.

In one embodiment, the side gears mesh with the pinion gears on generally diametrically opposed sides thereof. This arrangement develops gear separation forces which form cocking couples across the pinions that tend to urge the pinions against the walls of the retaining bores, thereby increasing the total biasing friction. The resulting increased frictional losses are effective to transfer torque from the low load or low traction side of the differential to the high load or high traction side.

The foregoing unequal torque proportioning feature and spin limiting feature may be employed separately or in combination to meet design requirements.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF EXEMPLARY EMBODIMENTS

Figure 1:
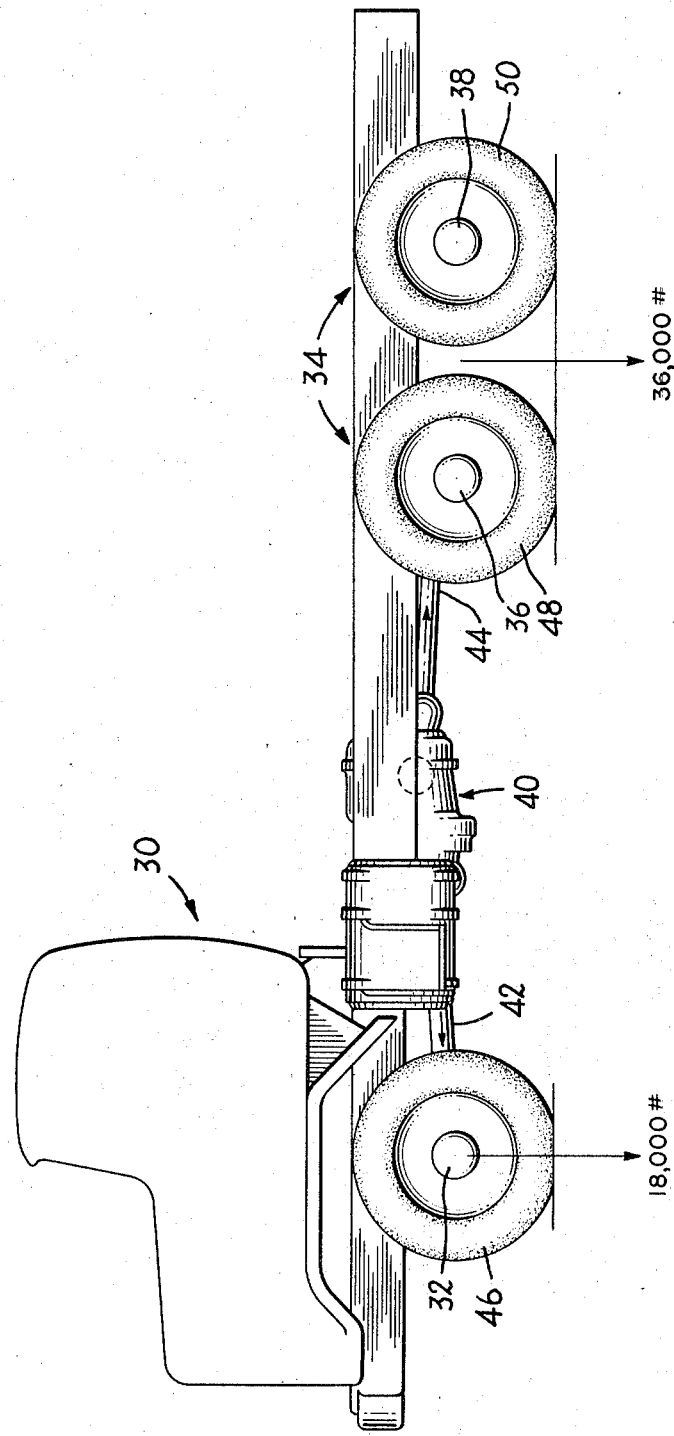
FIG. 1 is a schematic view of an all-wheel drive vehicle equipped with the inter-axle differential of the present invention.

FIG. 1 illustrates a typical all-wheel drive vehicle 30 having a front axle 32 and a rear tandem axle group 34, including individual axles 36 and 38. Although only a single front axle is depicted, it will be understood that a group of axles could be employed instead. The rear tandem 34 could similarly be replaced by a single axle or by a larger or additional axle groups.

A transfer case 40 is located in the drive train between the front and rear axles and, in accordance with the invention, includes a torque proportioning differential for dividing the engine-transmission output torque between the axles. Power is transmitted to the front axle 32 by a drive shaft 42 and to the rear tandem 34 by a drive shaft 44. Tires 46, 48 and 50 are of course provided on the respective axles 32, 36 and 38. A typical load distribution among the front and rear axles is also illustrated, as is described more fully hereinafter.

Figure 2:
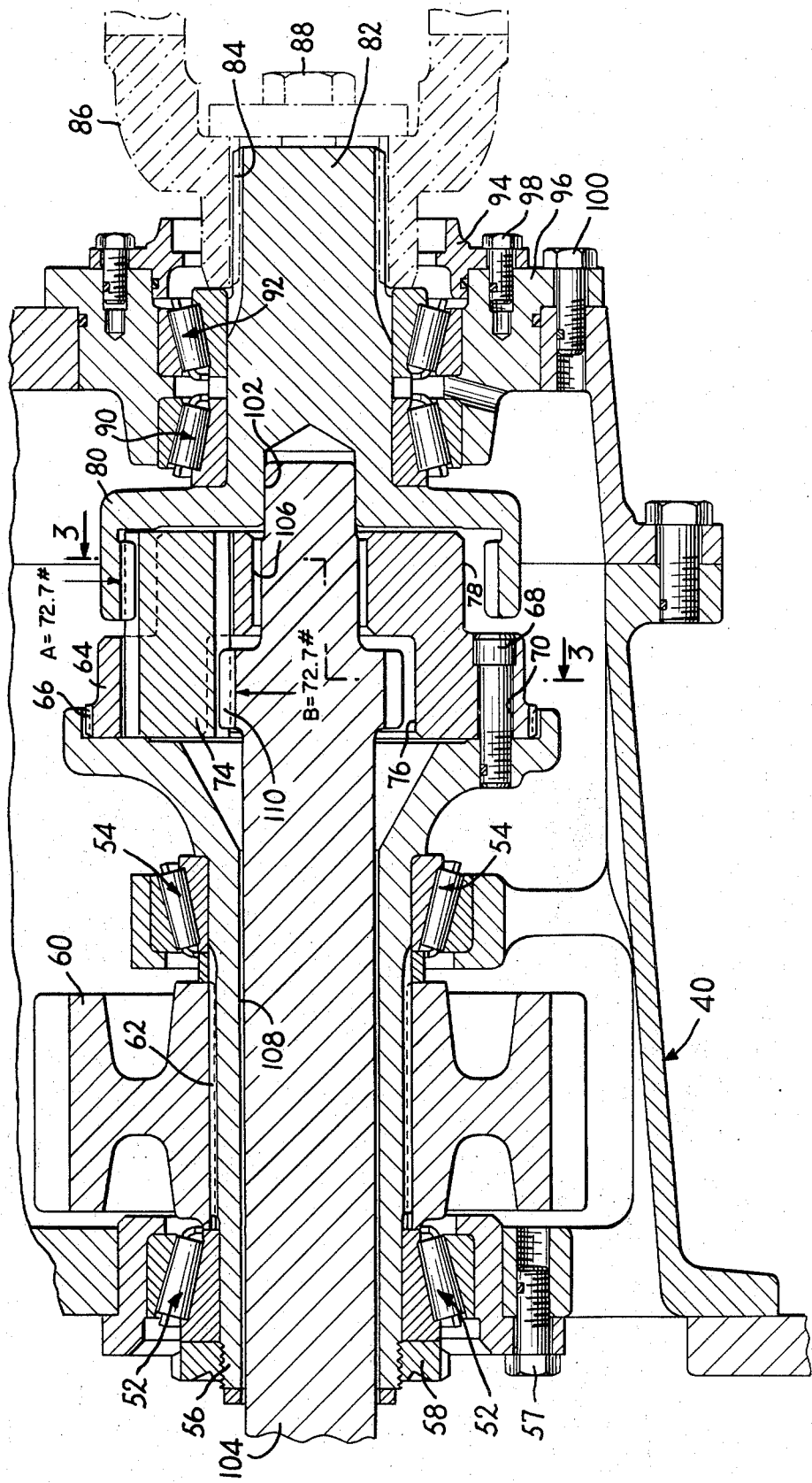
FIG. 2 is a partial vertical sectional view of one embodiment of the planetary-type differential of the present invention.

In FIG. 2, a torque dividing and spin limiting differential constructed in accordance with the invention is shown in detail. The transfer case 40 encloses the moving parts of the differential and supports roller bearing assemblies 52 and 54 which facilitate movement of a differential driving member 56 relative to the case 40. The front bearing assembly 52 is mounted to the case 40 by bolts 57 and, together with a retainer nut 58 threadedly received on the driving member 56, holds the bearing assemblies 52 and 54 in proper position. A gear 60, splined at 62 to the driving member 56, is driven by a power input means (not shown) operatively connected to the engine-transmission train of the vehicle, thereby transmitting torque to the differential.

Figure 3:
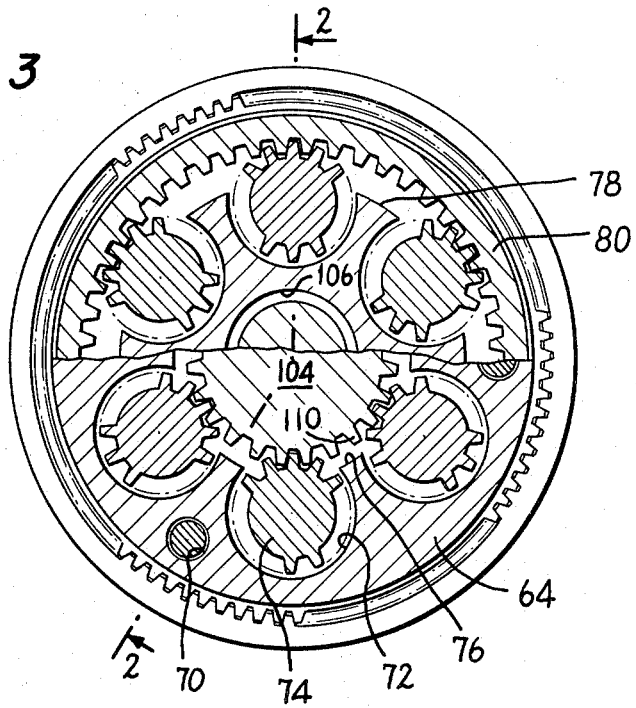
FIG. 3 is a partial secitonal view, taken along the line 3—3 of FIG. 2 and looking in the direction of the arrows.

A pinion cage 64 is splined at 66 to the differential driving member 56 and is rigidly held in that position by bolts 68 extending through holes 70 formed in the cage. Referring now to FIG. 3 as well, the pinion cage 64 has six cylindrical bores or sockets 72 extending parallel to and symmetrically arranged about the axis of the pinion cage. A plurality of shaftless pinion gears 74 are mounted in the cylindrical bores 72 so that they can rotate about their own axes as well as the axis of the pinion cage. To this end, the walls of bores 72 are hardened and loosely fit the pinion outside diameters. An axial counterbore 76 extends approximately halfway through the pinion cage 64 and has a diameter sufficient to intersect the bores 72 (see FIG. 2), whereby the teeth of the pinions 74 are exposed and extend inward beyond the surface of the counterbore 76. The pinion cage further has an outer surface 78 of reduced diameter which also intersects the bores 72, but at the opposite end from the counterbore 76, and exposes the pinions exteriorly of the pinion cage 64. As can be seen from FIG. 2, these cut away portions of the bores 72 are on diametrically opposed sides of the bores.

The teeth of the pinions 74 protruding beyond the surface 78 mesh with the teeth of a ring gear 80. The ring gear is integrally formed on a shaft 82, which in turn is splined at 84 to a universal joint 86, indicated in phantom in FIG. 2. The universal is held in the splined position by a bolt 88. The drive shaft 44 (FIG. 1) transmitting torque to the rear tandem 34 is connected to the other half of the universal.

The shaft 82 is rotatably supported by a pair of roller bearing assemblies 90 and 92. These assemblies are held in place and protected from dust and road dirt by a rear bearing cover 94 which is mounted to the rear bearing support plate 96 by bolts 98. The plate 96 is rigidly bolted to the case 40, as at 100.

An axial bore 102 is provided in shaft 82 for receiving the end of a shaft 104 which supplies torque to the front axle 32 and which, therefore, also extends through the counterbore 76 and axially aligned bores 106 and 108 in the pinion cage 64 and the differential driving member 56, respectively. A sun gear 110 is integrally formed on the shaft 104 for meshing with the pinion gear teeth protruding into counterbore 76 (FIGS. 2 and 3).

The embodiment described above is designed to divide the input torque from the engine-transmission system between the front axle 32 and the rear axle tandem 34 in proportion to the axle or axle group load division and, in that way, prevent premature single-axle spinout on the low load side, assuming all tires are on a uniform coefficient surface at the limit of available traction. For example, a full time all-wheel drive 3-axle 6×6 truck with 36,000 lbs. on the tandem and 18,000 lbs. on the front axle, as shown in FIG. 1, would require twice as much torque to be directed to the tandem as to the front axle to prevent the tires on the front axle from spinning out prematurely when the vehicle is started from a standstill. The torque division is acomplished by proper selection of the pitch diameters of the two side gears 80 and 110 of the differential. Thus, for the example above, the pitch diameter of the ring gear 80 should be twice that of the sun gear 110. Gear diameter ratios other than 2 : 1 might of course be used, depending upon the load distribution among the axles. Generally, however, the ratio should approximate the loading ratio.

It will be apparent, therefore, that the foregoing construction affords unequal torque proportioning related to axle loading and thus significantly increases the useful wear life of front axles and tires, because of the reduction of the likelihood of premature spinning out. It also increases axle gear life by proportioning the torque load.

As an additional advantage, the two-gear plane configuration, i.e., with the pinion-sun gear mesh and pinion-ring gear mesh being longitudinally spaced, provides a shorter, more compact unit across the output shafts 82 and 104 than three successive gear-mesh prior art designs.

A second feature of the invention resists immobilization of all axles being served by the inter-axle differential when one wheel of the vehicle is located on a low coefficient surface, such as ice. With a conventional differential, the wheel with the poor traction spins and the other wheels with good traction stand still. The present invention, however, permits the axle or axles on the high traction side of the inter-axle differential to be given a greater percentage of torque than that available with a conventional differential or where all wheels are located on a uniform coefficient surface, thus enabling the vehicle to move across the low coefficient surface.

This feature is afforded by the shaftless pinion and pinion cage construction previously referred to, acting in conjunction with the side gears of the differential. It achieves this, in general, by introducing frictional losses into the differential gear system, thereby making the differential less efficient in transferring torque to the low traction side. Specifically, the losses are caused by forcing, or biasing, the pinion against the walls of the cylindrical bores 72 of the pinion cage 64 so that energy is lost when the pinions rotate on their own axes. As a less efficient differential transfers more torque to the high traction side, a greater percentage of the engine-transmission torque is thus available to enable other wheels of the vehicle to operate.

Figure 4:
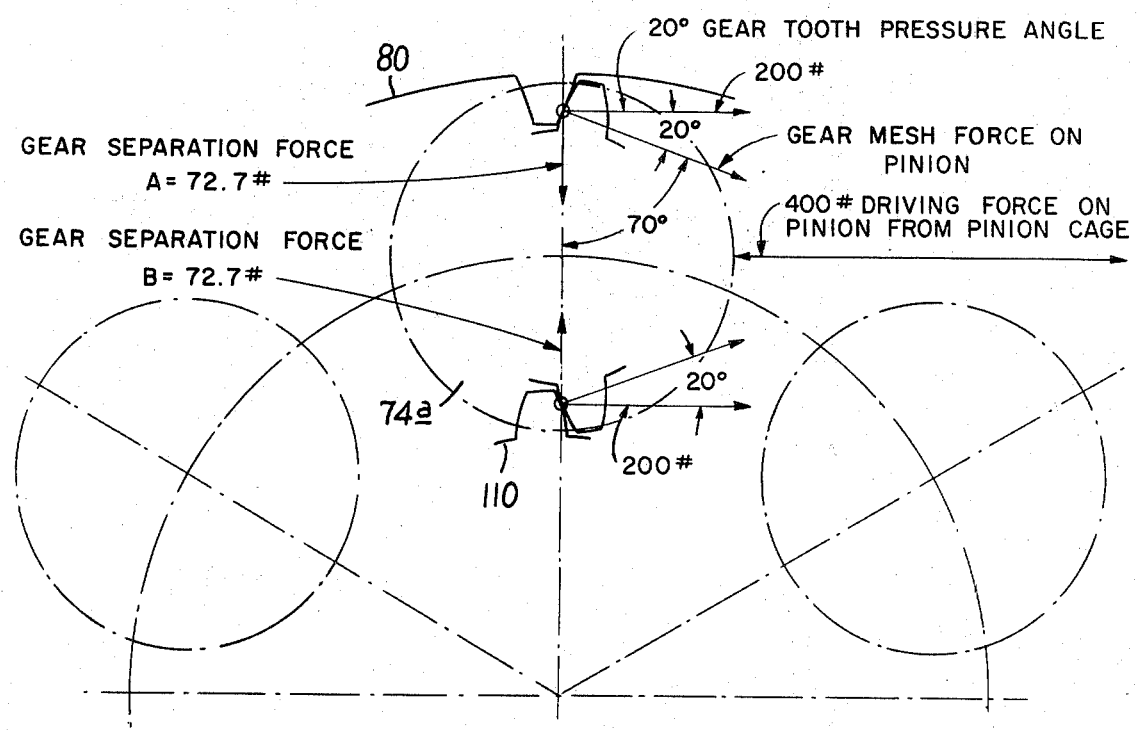
FIG. 4 is a diagrammatic illustration of the gear separation forces acting between the pinion gears and the side gears.

The above frictional biasing characteristic of the invention may be more fully understood by reference to FIG. 4. FIG. 4 illustrates the resolution of the various forces operating on the pinions 74 during differential operation. The specific force values and angles depicted are intended to be illustrative only. For clarity, only the forces acting on one pinion are shown, but it will be understood that like forces act on the other pinions as well.

A driving force of 400 lbs. on each pinion from the pinion cage (not shown in FIG. 4) is assumed. With a 20° gear tooth pressure angle for the pinion 74a, the sun gear 110 and the ring gear 80, the forces at each of the pinion-ring gear interface and the pinion-sun gear interface resolve into (1) a 200 lb. force directed in opposition to the 400 lb. force from the pinion cage and (2) a gear separation force of 72.7 lbs. directed radially toward the pinion axis. Since the ring gear 80 and the sun gear 110 mesh with the pinion 74a on generally opposite sides thereof (see FIGS. 2 and 3), the gear separation force A at the pinion-ring gear interface and the gear separation B force at the pinion-sun gear interface are opposed.

Referring further to FIGS. 2 and 3, the cylindrical bores 72 of the pinion cage 64 wrap around the pinions 74 in the area directly opposite the gear meshes of the pinion and sun gears and the pinion and ring gears. The gear separation forces A and B (FIG. 4) thus urge the outside diameters of the pinions 74 directly against the bore wall portions opposite the respective meshes. Moreover, as the sun gear 110 and ring gear 80 meshes with the pinions are longitudinally spaced, the separation forces A and B are likewise separated and a cocking couple acting across each pinion 74 is formed.

The cocking couple serves to increase the pinion radial thrust and thereby increases the differential frictional bias. Although with normal part deflections the pinions 74 remain in contact with the bore walls along most of their lengths the cocking couple also serves to increase the bearing pressure at the pinion ends, and the consequent slight surface deflections and digging in at the ends tend to increase the frictional losses between the pinions and the bores. This further increases the bias torque.

Since the pinion cage 64 wraps around each pinion 74, it provides a relatively large circumferential retaining area for the gear. Consequently, the wear lives of the pinions 74 and cylindrical bores 72 are enhanced, and the correct positioning of the pinions in the bores is assured.

The pinions 74 are lubricated primarily by oil flowing through the gear mesh areas and swept around the bore cavities 72 by the pinion teeth, the pinions acting in effect as gear pumps in this regard. Since with the two-gear plane design of the present invention the entire pinion bore length is therefore covered by a gear-mesh oil entry area, the invention offers improved pinion lubrication.

The invention, by providing the aforementioned frictional biasing characteristic automatically, greatly extends the percentage of time that the vehicle will operate with a strain free, non-locked-up drive train. By comparison, a declutch front axle vehicle must have the drive train locked up whenever all-wheel drive is required, and a non-biasing center differential drive must have the drive train locked at the first indication of wheel spin. As the present invention therefore permits a reduction in the hours of vehicle operation with a locked drive train, it effectively extends the working life of the drive train components. Furthermore, wear and power loss attributable to the biasing feature in normal highway operation is negligible, since under normal high-traction highway turns the internal motion of the differential as applied between axles or axle groups is extremely slow and the torque loading is reduced.

Additionally, the virtual independence of the axles coupled to the inter-axle differential provides greater anti-skid safety on wet or slippery roads. The automatic center differential biasing feature of the invention further improves anti-skid safety by resisting momentary wheel slippage due to road bounce, weight shift, or a sudden change in surface coefficient.

Any appropriate gear design, for example, spur gears or helical gears, may be used for the sun, pinion and ring gears.

It will be understood by those skilled in the art that the above described embodiments are intended to be exemplary, in that they are susceptible of modification and variation without departing from the spirit and scope of the invention. All such modifications and variations, therefore, are intended to be included within the invention as defined in the appended claims.

I claim:

1. In a vehicle having a front axle, a rear axle, a prime mover, a drive train drivably coupling the prime mover to the front and rear axles, and a differential in the drive train for dividing the prime mover-drive train output torque between the front axle and the rear axle in approximately the same proportion as the load distribution between the front and rear axles, the improvement in the differential comprising:
   a pinion gear;
   a rotatable pinion cage;
   means defining a cylindrical bore in the pinion cage for rotatably receiving the pinion gear, the wall of the bore having at least two longitudinally spaced cut away portions to expose corresponding portions of the pinion gear;
   means coupled to the drive train for rotatably driving the pinion cage, thereby transmitting torque to the differential;

a first side gear meshing with one exposed pinion gear portion and further being operatively coupled to one of the front and rear axles; and a second side gear meshing with the other exposed pinion gear portion and further being operatively coupled to the other of the front and rear axle;

the first and second side gears having different pitch diameters, whereby each side gear transmits torque from the pinion gage to the associated axle in proportion to the ratio of the pitch diameters; and whereby when one of the front and rear axles encounters low traction conditions relative to the other axle, gear separation forces acting between the rotating pinion gear and the first and second side gears urge the pinion gear against the bore wall thereby generating frictional forces therebetween which are effective to transfer additional torque to the other axle.

2. The vehicle of claim 1 wherein:

the at least two cut away portions of the bore wall are located on generally opposite sides of the bore;

whereby the gear separation forces acting between the first side gear and the pinion gear are generally oppositely directed from those acting between the second side gear and the pinion gear and thereby form a couple across the pinion gear so as to provide frictional forces between the pinion gear and the bore wall proportional to the magnitude of the couple.

3. The vehicle of claim 1 wherein the improvement in the differential further comprises:

a plurality of cylindrical bores in the pinion cage, the bores being symmetrically arranged about the rotational axis of the cage;

a pinion gear rotatably received in each bore; and wherein the first side gear meshes with one exposed portion of each pinion gear and the second side gear meshes with the other exposed portion of each pinion gear.

4. The vehicle of claim 1 wherein the first side gear is a ring gear and the second side gear is a sun gear.

5. The vehicle of claim 4 wherein:

a plurality of pinion gears are rotatably held by the pinion cage, the pinion gears being symmetrically arranged about the rotational axis of the pinion cage with their axes of rotation generally parallel to said rotational axis; and the sun gear and the ring gear are positioned with their rotational axes coaxial with the rotational axis of the pinion gear cage.

6. An unequal torque proportioning differential for use with vehicles having multiple driving axles comprising:

a pinion gear;

a rotatable pinion cage;

means defining a cylindrical bore in the pinion cage for rotatably receiving the pinion gear, the wall of the bore having at least two longitudinally spaced cut away portions to expose corresponding portions of the pinion gear;

means adapted to be coupled to the vehicle drive train for rotatably driving the pinion cage so as to transmit torque to the differential;

a first side gear meshing with one exposed pinion gear portion and being operatively coupled to a first driving axle; and a second side gear meshing with the other exposed pinion gear portion and being operatively coupled to a second driving axle;

the first and second side gears having different pitch diameters, whereby each side gear transmits torque to its associated driving axle in proportion to the ratio of the pitch diameters of the first and second side gears; and whereby when one of said first or second axles encounters low traction conditions relative to the other axle, gear separation forces acting between the rotating pinion gear and the first and second side gears urge the pinion gear against the bore wall thereby generating frictional forces therebetween which are effective to transfer additional torque to the other axle.

7. The differential of claim 6 wherein:

the at least two cut away portions of the bore wall are located on generally opposite sides of the bore;

whereby the gear separation forces acting between the pinion gear and the first side gear are generally oppositely directed from those acting between the pinion gear and the second side gear, thereby forming a couple across the pinion gear which develops frictional forces between the pinion gear and the bore in proportion to the magnitude of the couple.

8. The differential of claim 7 wherein:

a plurality of pinion gears are rotatably held by the pinion cage, the pinion gears being arranged symmetrically about the rotational axis of the pinion cage with their axes of rotation generally parallel to said rotational axis; and each of the pinion gears meshes with the first and second side gears.

9. The differential of claim 7 wherein the first side gear comprises a ring gear and the second side gear comprises a sun gear.

10. A differential for resisting differential spinout comprising:

a pinion cage having an axis of rotation and being rotatably driven by means supplying input torque to the differential, the pinion cage having a cylindrical bore provided therein with a longitudinal axis parallel to the axis of rotation of the pinion cage;

an elongate pinion gear having an axis of rotation positioned in the cylindrical bore whereby the pinion gear is retained by the wall of the bore;

the wall of the bore having at least two longitudinally spaced portions cut away to expose the pinion gear positioned therein, the cut away portions being positioned on generally opposite sides of the bore;

a first side gear operatively coupled to a first output shaft and positioned to mesh with the pinion gear through one cut away portion of the bore wall; and a second side gear operatively coupled to a second output shaft and positioned to mesh with the pinion gear through the other cut away portion;

whereby the torque applied to the pinion cage generates gear separation forces between the pinion gear and first side gear and the pinion gear and second side gear at their respective meshes when one of the output shafts is connected to a low traction load and the other output shaft to a high traction load, which forces form a couple across the pinion gear which urge the pinion gear against the bore wall opposite the respective meshes, so that frictional forces are developed between the pinion gear and the bore wall which are effective to transfer additional torque to the high traction side.

11. The differential of claim 10 wherein the first side gear comprises a ring gear and the second side gear comprises a sun gear.

12. The differential of claim 10 wherein:

a plurality of the cylindrical bores are provided in the pinion cage;

an elongate pinion gear is positioned in each bore; and the first and second side gears mesh with each pinion through the cut away portions of said bores.

13. The differential of claim 12 wherein:

the cylindrical bores and associated pinion gears are arranged symmetrically about the axis of rotation of the pinion cage; and the first and second side gears are positioned with their axes coaxial with the axis of the pinion cage.

* * * * *